(12) United States Patent
Byun

(10) Patent No.: US 12,036,897 B2
(45) Date of Patent: Jul. 16, 2024

(54) VEHICLE SEAT MOVING APPARATUS AND CONTROL METHOD THEREOF

(71) Applicant: HYUNDAI TRANSYS INC., Chungcheongnam-do (KR)

(72) Inventor: Deuk Kyu Byun, Gyeonggi-do (KR)

(73) Assignee: HYUNDAI TRANSYS INC., Chungcheongnam-do (KR)

( * ) Notice: Subject to any disclaimer, the term of this patent is extended or adjusted under 35 U.S.C. 154(b) by 891 days.

(21) Appl. No.: 17/096,673

(22) Filed: Nov. 12, 2020

(65) Prior Publication Data

US 2021/0155121 A1 May 27, 2021

(30) Foreign Application Priority Data

Nov. 21, 2019 (KR) .................. 10-2019-0150374

(51) Int. Cl.
*B60N 2/00* (2006.01)
*B60N 2/02* (2006.01)
*B60N 2/06* (2006.01)

(52) U.S. Cl.
CPC ........... *B60N 2/02246* (2023.08); *B60N 2/06* (2013.01); *B60N 2/02253* (2023.08)

(58) Field of Classification Search
CPC ... B60N 2/02246; B60N 2/06; B60N 2/02253

USPC .......................................................... 701/49
See application file for complete search history.

(56) References Cited

U.S. PATENT DOCUMENTS

| | | | | |
|---|---|---|---|---|
| 7,336,570 | B1 * | 2/2008 | Shiomi ............... | G11B 7/0956 369/30.87 |
| 2004/0124655 | A1 * | 7/2004 | Takenoshita ........... | B60N 2/245 296/65.13 |
| 2018/0215287 | A1 * | 8/2018 | Koop ..................... | B60N 2/067 |
| 2018/0281623 | A1 * | 10/2018 | Matsumoto ............. | B60N 2/14 |

FOREIGN PATENT DOCUMENTS

| | | | | |
|---|---|---|---|---|
| CN | 207200607 U | * | 4/2018 | ............... H02P 6/04 |
| CN | 108372803 A | * | 8/2018 | ........... B60N 2/0232 |
| DE | 202010017499 U1 | * | 4/2012 | ............. G01D 5/145 |
| DE | 102015220839 B4 | * | 1/2023 | ............. C23C 2/003 |
| KR | 0135004 Y1 | | 1/1999 | |
| KR | 101634881 B1 | | 6/2016 | |
| KR | 1020190048406 A | | 5/2019 | |

* cited by examiner

*Primary Examiner* — Tiffany P Young (57) ABSTRACT

The present disclosure relates to a vehicle seat moving apparatus configured to control movement of a vehicle seat along a first transfer rail and a second transfer rail formed on the bottom of a vehicle so as to be spaced apart from each other in parallel and a control method thereof.

12 Claims, 4 Drawing Sheets

VEHICLE SEAT MOVING APPARATUS AND CONTROL METHOD THEREOF

CROSS-REFERENCE TO RELATED APPLICATION

This application claims, under 35 U.S.C. § 119(a), the benefit of priority to Korean Patent Application No. 10-2019-0150374 filed on Nov. 21, 2019, the entire contents of which are incorporated herein by reference.

BACKGROUND

(a) Technical Field

The present disclosure relates to a vehicle seat moving apparatus and a control method thereof, and more particularly to a vehicle seat moving apparatus capable of moving a vehicle seat along two transfer rails formed on the bottom of a vehicle so as to be spaced apart from each other in parallel and a control method thereof.

(b) Background Art

In an autonomous driving environment, rather than in an ordinary driver's driving situation that requires forward observation, a direction in which passengers are seated is not limited. In addition, much research and development has been conducted in connection with movement of a seat in a vehicle such that various activities are possible in the vehicle in a non-driving situation.

Particularly, in the case of a vehicle seat moving structure that is generally used at present, optimum design is made such that a vehicle seat can be moved about 300 mm using a single motor. In this case, however, activities requiring large space, such as sleep and rest, are limited.

In order to solve this problem, a vehicle seat moving structure having a long seat moving range is required. To this end, a new mechanism including a transfer rail having a length of about 2,000 mm and an additional driving motor is necessary. Furthermore, a structure capable of mounting the new mechanism in the vehicle must also be developed.

That is, two driving motors are necessary to move the vehicle seat along two transfer rails. Even when the two driving motors are simultaneously operated, however, it is substantially difficult to completely synchronize operations of the two driving motors with each other due to a voltage drop, an error of a mechanical mechanism, and free movement of the motors caused by gears, etc.

In the case in which operations of the two driving motors are not synchronized with each other, the transfer rails may be twisted during movement of the vehicle seat. Furthermore, movement of the vehicle seat may not be possible, and the vehicle seat may be physically damaged.

The above information disclosed in this Background Art section is provided only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

It is an object of the present invention to provide a vehicle seat moving apparatus capable of preventing the occurrence of twisting and pinching at the time of moving a vehicle seat along a long transfer rail having a length of about 2,000 mm using two motors and a control method thereof.

The objects of the present invention are not limited to that described above. The objects of the present invention will be clearly understood from the following description of embodiments and could be implemented by means defined in the claims and a combination thereof.

In order to accomplish the above object, a vehicle seat moving apparatus according to the present invention and a control method thereof include the following constructions.

In one aspect, the present invention provides a vehicle seat moving apparatus configured to control movement of a vehicle seat along a first transfer rail and a second transfer rail formed on the bottom of a vehicle so as to be spaced apart from each other in parallel, the vehicle seat moving apparatus including a first transfer module disposed at one side of the vehicle seat, the first transfer module including a first motor configured to generate driving force necessary to move the vehicle seat on the first transfer rail and a first sensor configured to detect a rotational speed of the first motor, a second transfer module disposed at the other side of the vehicle seat, the second transfer module including a second motor configured to generate driving force necessary to move the vehicle seat on the second transfer rail and a second sensor configured to detect a rotational speed of the second motor, and a control module configured to control at least one of the first motor and the second motor.

The control module may include a first motor position information input unit configured to receive position information of the first motor from the first sensor, a second motor position information input unit configured to receive position information of the second motor from the second sensor, a comparison unit configured to compare the position information of the first motor and the position information of the second motor with each other, a determination unit configured to determine whether correction of current supplied to at least one of the first motor and the second motor is necessary based on the result of comparison of the comparison unit, a first motor driving unit configured to supply current to the first motor based on the result of determination of the determination unit, and a second motor driving unit configured to supply current to the second motor based on the result of determination of the determination unit.

Upon receiving a vehicle seat moving command based on user manipulation, the first motor driving unit and the second motor driving unit may supply currents lower than the maximum allowable currents of the first motor and the second motor to the first motor and the second motor, respectively.

Each of the first sensor and the second sensor may be a Hall sensor, and the comparison unit may compare the number of first pulses output from the first sensor for a predetermined time and the number of second pulses output from the second sensor for the predetermined time with each other.

In the case in which the difference between the number of first pulses and the number of second pulses is equal to or greater than a predetermined value a as the result of comparison of the comparison unit, the determination unit may determine that correction of the amount of current of a motor having a smaller number of pulses is necessary.

The first motor driving unit or the second motor driving unit may supply the maximum allowable current to the motor having the smaller number of pulses based on the result of determination of the determination unit.

In the case in which the difference between the number of first pulses and the number of second pulses is equal to or greater than a predetermined value b as the result of comparison of the comparison unit, the determination unit may determine that stopping movement of the vehicle seat is necessary, the predetermined value b being greater than the predetermined value a.

At least one of the first motor driving unit and the second motor driving unit may rewind a motor having a larger number of pulses based on the result of determination of the determination unit, and the first motor driving unit and the second motor driving unit may stop supply of current to the first motor and the second motor, respectively.

In another aspect, the present invention provides a control method of a vehicle seat moving apparatus configured to control movement of a vehicle seat along a first transfer rail and a second transfer rail formed on the bottom of a vehicle so as to be spaced apart from each other in parallel, the vehicle seat moving apparatus including a first transfer module disposed at one side of the vehicle seat, the first transfer module including a first motor configured to generate driving force necessary to move the vehicle seat on the first transfer rail and a first sensor configured to detect a rotational speed of the first motor; and a second transfer module disposed at the other side of the vehicle seat, the second transfer module including a second motor configured to generate driving force necessary to move the vehicle seat on the second transfer rail and a second sensor configured to detect a rotational speed of the second motor, wherein the control method includes receiving a vehicle seat moving command from a user, a first motor driving unit and a second motor driving unit supplying currents lower than maximum allowable currents of the first motor and the second motor to the first motor and the second motor, respectively, a first motor position information input unit and a second motor position information input unit acquiring position information of the first motor detected by the first sensor and position information of the second motor detected by the second sensor, respectively, a comparison unit comparing the position information of the first motor and the position information of the second motor with each other and a determination unit determining whether correction of current supplied to at least one of the first motor and the second motor is necessary based on the result of comparison of the comparison unit, and performing correction of current supplied to any one of the first motor and the second motor upon the determination unit determining that correction of current supplied to at least one of the first motor and the second motor is necessary.

Each of the first sensor and the second sensor may be a Hall sensor, in the step of determining whether correction of the supplied current is necessary, the comparison unit may compare the number of first pulses output from the first sensor for a predetermined time and the number of second pulses output from the second sensor for the predetermined time with each other, and in the case in which the difference between the number of first pulses and the number of second pulses is equal to or greater than a predetermined value a as the result of comparison of the comparison unit, the determination unit may determine that correction of an amount of current of a motor having a smaller number of pulses is necessary, and in the step of performing correction of the supplied current, the first motor driving unit or the second motor driving unit may supply the maximum allowable current to the motor having the smaller number of pulses based on the result of determination of the determination unit.

The control method may further include the comparison unit comparing the number of first pulses and the number of second pulses with each other and the determination unit determining whether to stop movement of the vehicle seat based on the result of comparison of the comparison unit, after the step of performing correction of the supplied current.

In the step of determining whether to stop movement of the vehicle seat, in the case in which the difference between the number of first pulses and the number of second pulses is equal to or greater than a predetermined value b as the result of comparison of the comparison unit, the determination unit may determine that stopping movement of the vehicle seat is necessary, the predetermined value b being greater than the predetermined value a, and upon the determination unit determining that movement of the vehicle seat must be stopped, the control method may further include at least one of the first motor driving unit and the second motor driving unit rewinding a motor having a larger number of pulses based on the result of determination of the determination unit and the first motor driving unit and the second motor driving unit stopping supply of current to the first motor and the second motor, respectively.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention, examples of which are illustrated in the accompanying drawings and described below. However, the present invention may be embodied in many different forms and should not be construed as limited to the embodiments set forth herein. Rather, these embodiments are provided so that the present invention will be thorough and complete, and will fully convey the scope of the present invention to those skilled in the art. The embodiments are merely given to make the disclosure of the present invention perfect to those skilled in the art.

The term "unit" or "module" used in this specification signifies one unit that processes at least one function or operation, and may be realized by hardware (for example, a processor, controller or other type of computer hardware), software, or a combination thereof.

In addition, the terms "first" and "second" are used in this specification only to distinguish between the same elements, and the elements are not limited as to the sequence therebetween in the following description.

In addition, the "number of sensors" used in this specification may be defined as the number of pulse signals applied within a unit range.

Hereinafter, a vehicle seat moving apparatus according to an embodiment of the present invention will be described with reference to FIGS. 1 to 4.

Figure 1:
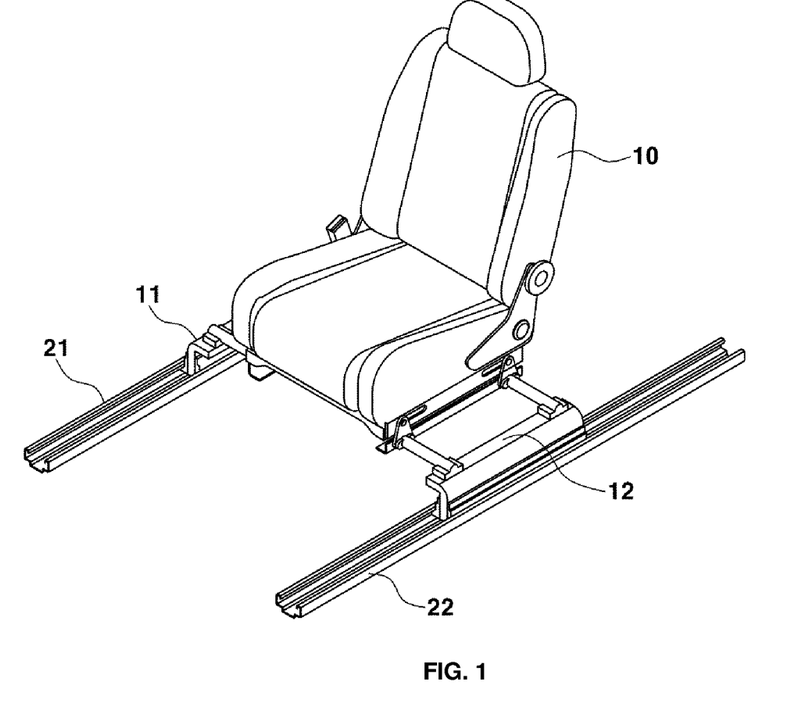
FIG. 1 is a conceptual view illustrating a vehicle seat moving apparatus according to an embodiment of the present invention and a control method thereof.

The vehicle seat moving apparatus according to the embodiment of the present invention is an apparatus configured to control the movement of a vehicle seat 10 along a first transfer rail 21 and a second transfer rail 22 formed on the bottom of a vehicle so as to be spaced apart from each other in parallel.

Figure 2:
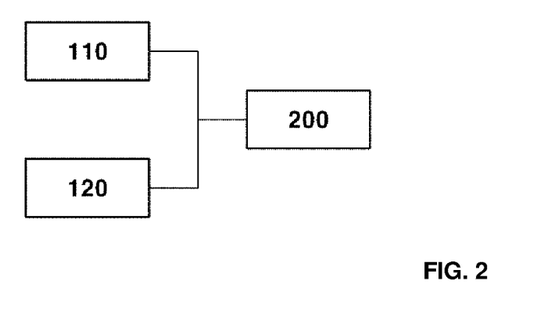
FIG. 2 is a block diagram schematically showing the vehicle seat moving apparatus according to the embodiment of the present invention.

As shown in FIGS. 1 and 2, the vehicle seat moving apparatus includes a first transfer module 11, a second transfer module 12, and a control module 200.

The first transfer module 11 is disposed at one side of the vehicle seat 10, and includes a first motor 110 and a first sensor. The second transfer module 12 is disposed at the other side of the vehicle seat 10, and includes a second motor 120 and a second sensor.

Here, the first motor 110 performs a function of generating driving force necessary to move the vehicle seat 10 on the first transfer rail 21, and the second motor 120 performs a function of generating driving force necessary to move the vehicle seat 10 on the second transfer rail 22.

In addition, the first sensor performs a function of detecting the rotational state, specifically the number of rotations and the rotational speed, of the first motor 110 in real time, and the second sensor performs a function of detecting the rotational state, specifically the number of rotations and the rotational speed, of the second motor 120 in real time. Each of the first sensor and the second sensor is preferably a Hall sensor configured to output a pulse signal based on rotation of a corresponding one of the motors.

Meanwhile, as described above, two motors, i.e. the first motor 110 and the second motor 120, are provided to move the vehicle seat. At this time, in the case in which the rotational speed or the rotation amount of the first motor 110 and the rotational speed or the rotation amount of the second motor 120 do not coincide with each other, the vehicle seat may be twisted or pinched during movement thereof.

In order to solve the above problem, therefore, the vehicle seat moving apparatus according to the embodiment of the present invention includes a control module 200 configured to control at least one of the first motor 110 and the second motor 120.

Figure 3:
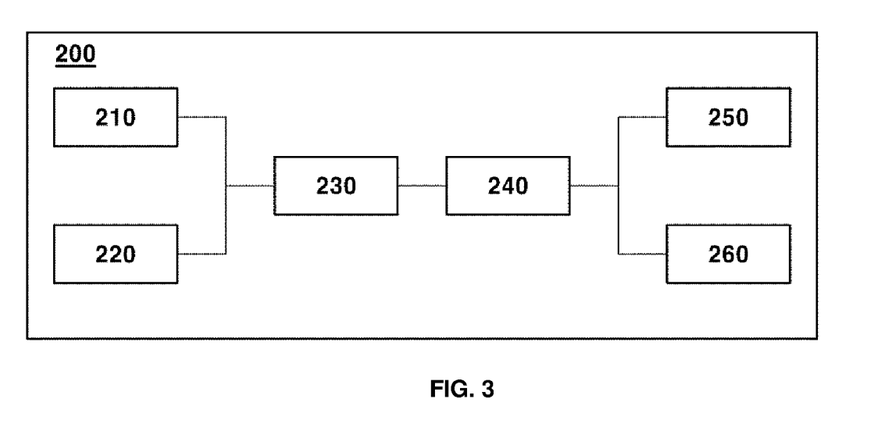
FIG. 3 is a block diagram schematically showing the detailed construction of a control module in the vehicle seat moving apparatus according to the embodiment of the present invention.

As shown in FIG. 3, the control module 200 includes a first motor position information input unit 210, a second motor position information input unit 220, a comparison unit 230, a determination unit 240, a first motor driving unit 250, and a second motor driving unit 260.

The first motor driving unit 250 performs a function of supplying current to the first motor 110, and the second motor driving unit 260 performs a function of supplying current to the second motor 120.

Particularly, upon receiving a vehicle seat moving command based on user manipulation, the first motor driving unit 250 and the second motor driving unit 260 supply currents lower than the maximum allowable currents of the first motor 110 and the second motor 120 to the first motor 110 and the second motor 120, respectively. Preferably, the first motor driving unit 250 and the second motor driving unit 260 supply current to the first motor 110 and the second motor 120, respectively, such that about 90% of the maximum output of each of the first motor 110 and the second motor 120 is output.

In addition, the amount of current supplied to each of the first motor 110 and the second motor 120 may be adjusted based on the determination result of the determination unit 240, a description of which will follow. This will be described below.

The first motor position information input unit 210 is configured to receive position information of the first motor 110 from the first sensor, and the second motor position information input unit 220 is configured to receive position information of the second motor 120 from the second sensor.

The comparison unit 230 performs a function of comparing the position information of the first motor 110, received from the first motor position information input unit 210, and the position information of the second motor 120, received from the second motor position information input unit 220, with each other.

Particularly, in the case in which each of the first sensor and the second sensor is a Hall sensor, as described above, the comparison unit 230 compares the number of first pulses output from the first sensor for a predetermined time and the number of second pulses output from the second sensor for the predetermined time with each other.

The determination unit 240 performs a function of determining whether it is necessary to correct the current supplied to at least one of the first motor 110 and the second motor 120 based on the result of comparison of the comparison unit 230 in order to prevent a possibility of the vehicle seat moving apparatus being twisted.

Specifically, in the case in which the difference between the number of first pulses and the number of second pulses is equal to or greater than a predetermined value a as the result of comparison of the comparison unit 230, the determination unit 240 determines that it is necessary to correct the amount of current of a motor having a smaller number of pulses.

The first motor driving unit 250 or the second motor driving unit 260 supplies the maximum allowable current to a motor having a smaller number of pulses based on the result of comparison of the comparison unit 230 and the result of determination of the determination unit 240.

An example of the operation of each component of the vehicle seat moving apparatus according to the embodiment of the present invention will be described with reference to FIGS. 4(a)-4(d).

FIG. 4(a) shows time-based output of the first motor 110, FIG. 4(b) shows time-based pulse output from the first sensor, FIG. 4(c) shows time-based pulse output from the second sensor, and FIG. 4(d) shows time-based output of the second motor 120.

Figure 4:
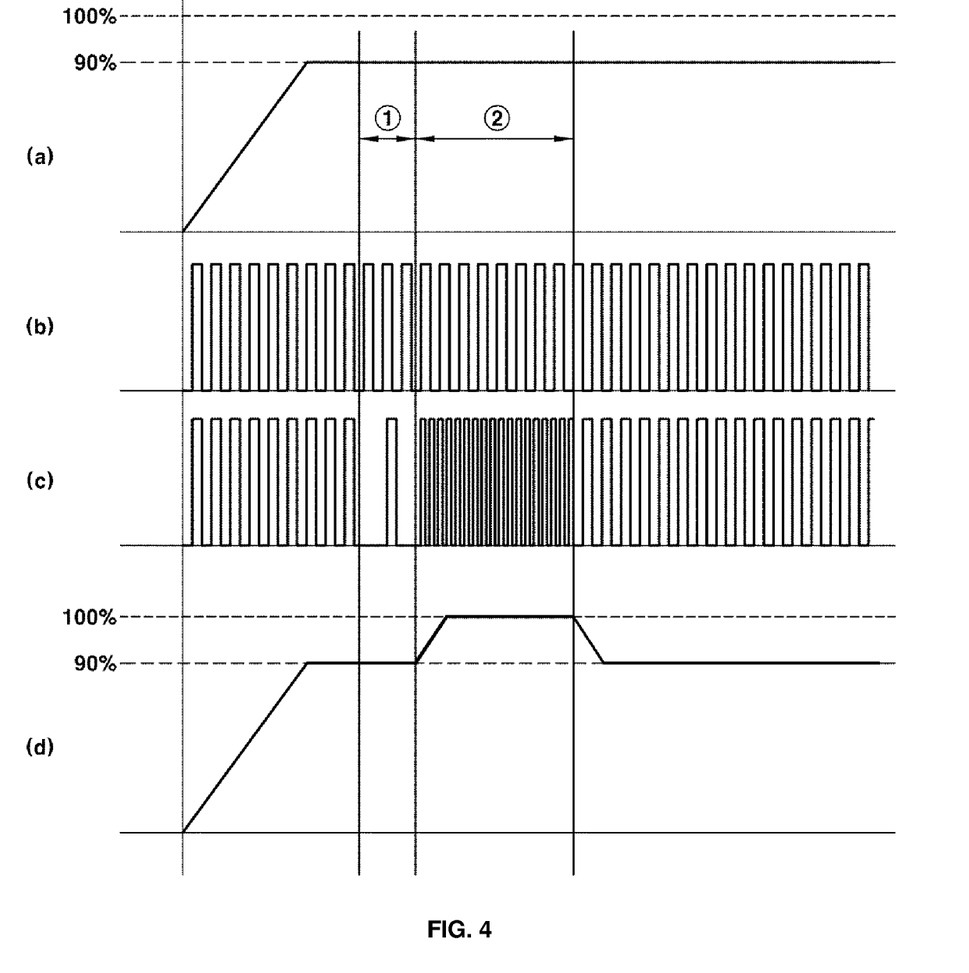
FIGS. 4(a)-4(b) are representing a graph illustrating an application example of the vehicle seat moving apparatus according to the embodiment of the present invention and the control method thereof.

First, upon receiving a vehicle seat moving command based on user manipulation, the first motor driving unit 250 and the second motor driving unit 260 supply current to the first motor 110 and the second motor 120, respectively, such that about 90% of the maximum output of each of the first motor 110 and the second motor 120 is output, as shown in FIGS. 4(*a*) and 4(*d*).

Subsequently, the comparison unit 230 compares the number of first pulses output from the first sensor in period ①, which is predetermined, and the number of second pulses output from the second sensor in period ① with each other. In the case in which the difference therebetween is equal to or greater than a predetermined value a, the determination unit 240 determines that it is necessary to correct the amount of current supplied to a motor having a smaller number of pulses, i.e. the second motor 120.

Subsequently, the second motor driving unit 260 increases the amount of current supplied to the second motor 120 in period ② such that the maximum allowable output of the second motor 120 is possible. As this time, the first sensor and the second sensor continuously monitor the states of the first motor 110 and the second motor 120, respectively.

Subsequently, in the case in which the difference between the number of first pulses and the number of second pulses up to now from the initial execution is less than the predetermined value a as the result of comparison of the comparison unit 230, the second motor driving unit 260 is controlled to reduce the amount of current supplied to the second motor 120 such that about 90% of the maximum output thereof is output based on determination of the determination unit 240.

It is possible to prevent the occurrence of twisting during movement of vehicle seat through the above process.

Meanwhile, even in the case in which the amount of current supplied to the motor is increased, as described above, the difference between the number of first pulses and the number of second pulses may be continuously increased, rather than decreased. This may be the case in which foreign matter is introduced into any one of the first transfer rail 21 and the second transfer rail 22 or the case in which any one of the transfer modules is pinched. Even though the amount of current supplied to the motor is increased, therefore, it may be not possible to overcome such a pinching problem.

In the case in which the difference between the number of first pulses and the number of second pulses is equal to or greater than a predetermined value b as the result of comparison of the comparison unit 230 even though the amount of current supplied to each of the first motor 110 and the second motor 120 is corrected, the determination unit 240 determines that it is necessary to stop the movement of the vehicle seat.

Here, b must be set to be greater than a. In this case, any one of the first motor driving unit 250 and the second motor driving unit 260 rewinds a motor having a larger number of pulses, and the first motor driving unit 250 and the second motor driving unit 260 stop supply of current to the first motor 110 and the second motor 120, respectively.

As a result, it is possible to prevent damage to the vehicle seat moving apparatus due to driving of the first motor 110 and the second motor 120 in spite of occurrence of the pinching problem.

Hereinafter, a control method of a vehicle seat moving apparatus according to an embodiment of the present invention will be described with reference to FIG. 5. A duplicate description of parts corresponding to the vehicle seat moving apparatus according to the embodiment of the present invention described above will be omitted.

Figure 5:
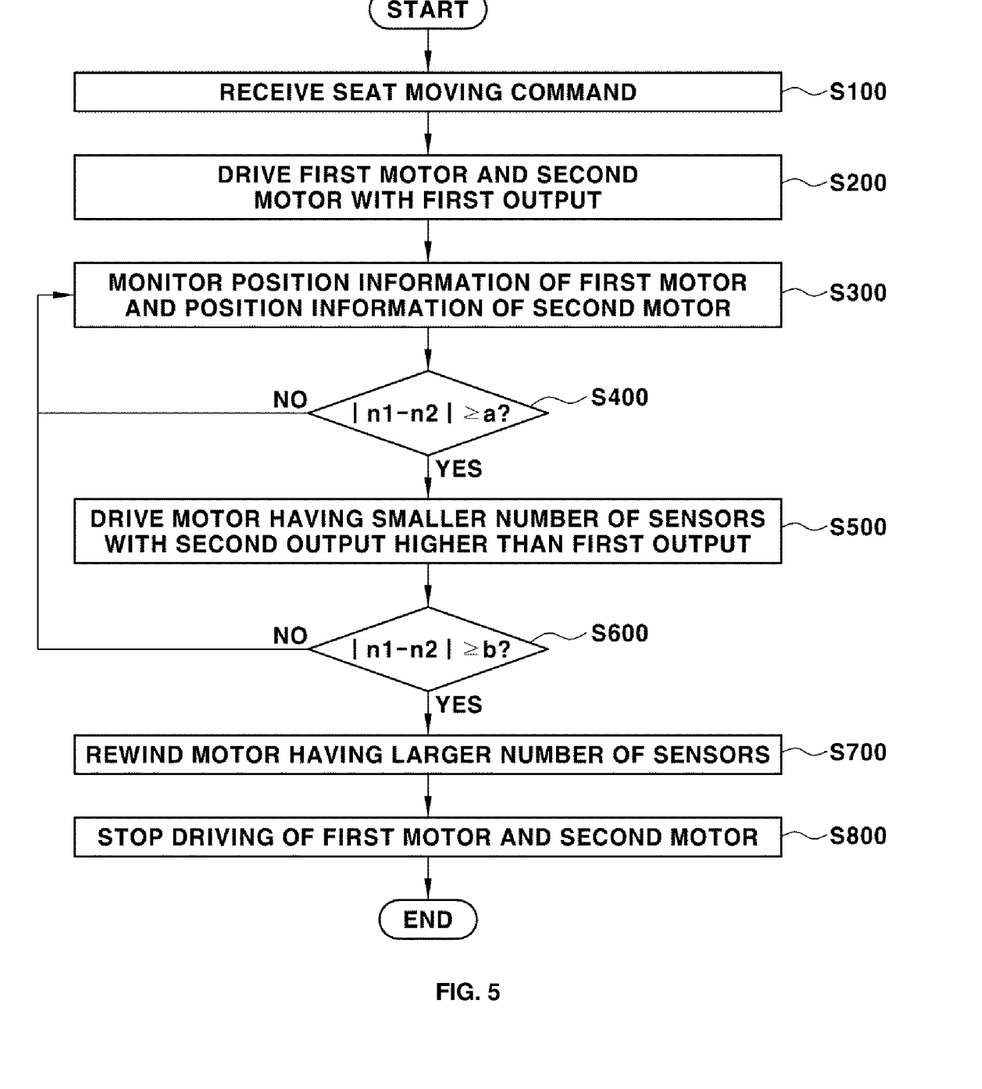
FIG. 5 is a time-series flowchart showing a vehicle seat control method according to an embodiment of the present invention.

In the control method of the vehicle seat moving apparatus according to the embodiment of the present invention, as shown in FIG. 5, a step (S100) of receiving a vehicle seat moving command from a user and a step (S200) of the first motor driving unit 250 and the second motor driving unit 260 supplying currents lower than the maximum allowable currents of the first motor 110 and the second motor 120 to the first motor 110 and the second motor 120, respectively, are performed.

Subsequently, a step (S300) of the first motor position information input unit 210 and the second motor position information input unit 220 acquiring position information of the first motor 110 detected by the first sensor and position information of the second motor 120 detected by the second sensor, respectively, is performed. Here, each of the first sensor and the second sensor is preferably a Hall sensor.

Subsequently, a step (S400) of the comparison unit 230 comparing the position information of the first motor 110 and the position information of the second motor 120 with each other and the determination unit 240 determining whether it is necessary to correct the current supplied to at least one of the first motor 110 and the second motor 120 based on the result of comparison of the comparison unit 230 is performed.

Specifically, the comparison unit 230 compares the number of first pulses output from the first sensor for a predetermined time and the number of second pulses output from the second sensor for the predetermined time with each other. In the case in which the difference between the number of first pulses and the number of second pulses is equal to or greater than a predetermined value a as the result of comparison of the comparison unit 230, the determination unit 240 determines that it is necessary to correct the amount of current of a motor having a smaller number of pulses.

Subsequently, upon the determination unit 240 determining that it is necessary to correct the current supplied to at least one of the first motor 110 and the second motor 120, a step (S500) of correcting the current supplied to at least one of the first motor 110 and the second motor 120 is performed. Specifically, the first motor driving unit 250 or the second motor driving unit 260 supplies the maximum allowable current to a motor having a smaller number of pulses based on the result of determination of the determination unit 240.

Subsequently, a step (S600) of the comparison unit 230 comparing the number of first pulses and the number of second pulses with each other again, and the determination unit 240 determining whether to stop the movement of the vehicle seat based on the result of comparison of the comparison unit 230 is performed.

Specifically, in the case in which the difference between the number of first pulses and the number of second pulses is equal to or greater than a predetermined value b as the result of comparison of the comparison unit 230, the determination unit 240 preferably determines that it is necessary to stop the movement of the vehicle seat. Here, b is greater than a.

Upon the determination unit 240 determining in the step (S600) of determining whether to stop the movement of the vehicle seat that the movement of the vehicle seat must be stopped, a step (S700) of at least one of the first motor driving unit 250 and the second motor driving unit 260 rewinding a motor having a larger number of pulses based on the result of determination of the determination unit 240 and a step (S800) of the first motor driving unit 250 and the second motor driving unit 260 stopping supply of current to the first motor 110 and the second motor 120, respectively, are performed.

As is apparent from the foregoing, the present invention may have the following effects from the construction, combination, and use of the embodiments described above.

In a vehicle seat moving apparatus according to an embodiment of the present invention and a control method thereof, the rotational states of two motors are detected in real time, and the amount of current supplied to each of the motors is adjusted in real time in the case in which there is a difference between the rotational states of the two motors, whereby it is possible to prevent the occurrence of twisting and pinching during movement of a vehicle seat.

In addition, it is possible to secure related technology in advance for entry into the upcoming autonomous vehicle age and to improve customer satisfaction through various changes of a seat position.

The above detailed description illustrates the present invention. In addition, the foregoing describes exemplary embodiments of the present invention. The present invention may be used in various different combinations, changes, and environments. That is, variations or modifications can be made within the conceptual scope of the present invention, equivalents to the disclosure of the present invention, and/or the scope of technology and knowledge in the art to which the present invention pertains. The embodiments describe the best mode for realizing the technical concept of the present invention, and variations required for the concrete application and use of the present invention are possible. Therefore, the above detailed description does not limit the present invention disclosed above. In addition, the appended claims should be interpreted to include other embodiments.

What is claimed is:

1. A vehicle seat moving apparatus configured to control movement of a vehicle seat along a first transfer rail and a second transfer rail formed on a bottom of a vehicle so as to be spaced apart from each other in parallel, the vehicle seat moving apparatus comprising:
a first transfer module disposed at one side of the vehicle seat, the first transfer module comprising a first motor configured to generate driving force necessary to move the vehicle seat on the first transfer rail and a first sensor configured to detect a rotational speed of the first motor;
a second transfer module disposed at the other side of the vehicle seat, the second transfer module comprising a second motor configured to generate driving force necessary to move the vehicle seat on the second transfer rail and a second sensor configured to detect a rotational speed of the second motor; and
a control module configured to control at least one of the first motor and the second motor.

2. The vehicle seat moving apparatus according to claim 1, wherein the control module comprises:
a first motor position information input unit configured to receive position information of the first motor from the first sensor;
a second motor position information input unit configured to receive position information of the second motor from the second sensor;
a comparison unit configured to compare the position information of the first motor and the position information of the second motor with each other;
a determination unit configured to determine whether correction of current supplied to at least one of the first motor and the second motor is necessary based on a result of comparison of the comparison unit;
a first motor driving unit configured to supply current to the first motor based on a result of determination of the determination unit; and
a second motor driving unit configured to supply current to the second motor based on the result of determination of the determination unit.

3. The vehicle seat moving apparatus according to claim 2, wherein, upon receiving a vehicle seat moving command based on user manipulation, the first motor driving unit and the second motor driving unit supply currents lower than maximum allowable currents of the first motor and the second motor to the first motor and the second motor, respectively.

4. The vehicle seat moving apparatus according to claim 2, wherein each of the first sensor and the second sensor is a Hall sensor, and
the comparison unit compares a number of first pulses output from the first sensor for a predetermined time and a number of second pulses output from the second sensor for the predetermined time with each other.

5. The vehicle seat moving apparatus according to claim 4, wherein, in a case in which a difference between the number of first pulses and the number of second pulses is equal to or greater than a predetermined value a as the result of comparison of the comparison unit, the determination unit determines that correction of an amount of current of a motor having a smaller number of pulses is necessary.

6. The vehicle seat moving apparatus according to claim 5, wherein the first motor driving unit or the second motor driving unit supplies a maximum allowable current to the motor having the smaller number of pulses based on the result of determination of the determination unit.

7. The vehicle seat moving apparatus according to claim 5, wherein, in a case in which the difference between the number of first pulses and the number of second pulses is equal to or greater than a predetermined value b as the result of comparison of the comparison unit, the determination unit determines that stopping movement of the vehicle seat is necessary, the predetermined value b being greater than the predetermined value a.

8. The vehicle seat moving apparatus according to claim 7, wherein at least one of the first motor driving unit and the second motor driving unit rewinds a motor having a larger number of pulses based on the result of determination of the determination unit, and the first motor driving unit and the second motor driving unit stop supply of current to the first motor and the second motor, respectively.

9. A control method of a vehicle seat moving apparatus configured to control movement of a vehicle seat along a first transfer rail and a second transfer rail formed on a bottom of a vehicle so as to be spaced apart from each other in parallel, the vehicle seat moving apparatus comprising:
a first transfer module disposed at one side of the vehicle seat, the first transfer module comprising a first motor configured to generate driving force necessary to move the vehicle seat on the first transfer rail and a first sensor configured to detect a rotational speed of the first motor; and a second transfer module disposed at the other side of the vehicle seat, the second transfer module comprising a second motor configured to generate driving force necessary to move the vehicle seat on the second transfer rail and a second sensor configured to detect a rotational speed of the second motor,
wherein the control method comprises:
receiving a vehicle seat moving command from a user;

a first motor driving unit and a second motor driving unit supplying currents lower than maximum allowable currents of the first motor and the second motor to the first motor and the second motor, respectively;

a first motor position information input unit and a second motor position information input unit acquiring position information of the first motor detected by the first sensor and position information of the second motor detected by the second sensor, respectively;

a comparison unit comparing the position information of the first motor and the position information of the second motor with each other and a determination unit determining whether correction of current supplied to at least one of the first motor and the second motor is necessary based on a result of comparison of the comparison unit; and performing correction of current supplied to any one of the first motor and the second motor upon the determination unit determining that correction of current supplied to at least one of the first motor and the second motor is necessary.

10. The control method according to claim 9, wherein each of the first sensor and the second sensor is a Hall sensor, in the step of determining whether correction of the supplied current is necessary, the comparison unit compares a number of first pulses output from the first sensor for a predetermined time and a number of second pulses output from the second sensor for the predetermined time with each other, and in a case in which a difference between the number of first pulses and the number of second pulses is equal to or greater than a predetermined value a as the result of comparison of the comparison unit, the determination unit determines that correction of an amount of current of a motor having a smaller number of pulses is necessary, and in the step of performing correction of the supplied current, the first motor driving unit or the second motor driving unit supplies a maximum allowable current to the motor having the smaller number of pulses based on a result of determination of the determination unit.

11. The control method according to claim 10, further comprising the comparison unit comparing the number of first pulses and the number of second pulses with each other and the determination unit determining whether to stop movement of the vehicle seat based on the result of comparison of the comparison unit, after the step of performing correction of the supplied current.

12. The control method according to claim 11, wherein in the step of determining whether to stop movement of the vehicle seat, in a case in which the difference between the number of first pulses and the number of second pulses is equal to or greater than a predetermined value b as the result of comparison of the comparison unit, the determination unit determines that stopping movement of the vehicle seat is necessary, the predetermined value b being greater than the predetermined value a, and upon the determination unit determining that movement of the vehicle seat must be stopped, the control method further comprises:

at least one of the first motor driving unit and the second motor driving unit rewinding a motor having a larger number of pulses based on the result of determination of the determination unit; and the first motor driving unit and the second motor driving unit stopping supply of current to the first motor and the second motor, respectively.

\* \* \* \* \*